Sept. 26, 1961     D. W. BARKLEY     3,001,901
METHOD OF PRODUCING ELECTRICALLY CONDUCTIVE ARTICLES
Filed Dec. 1, 1955
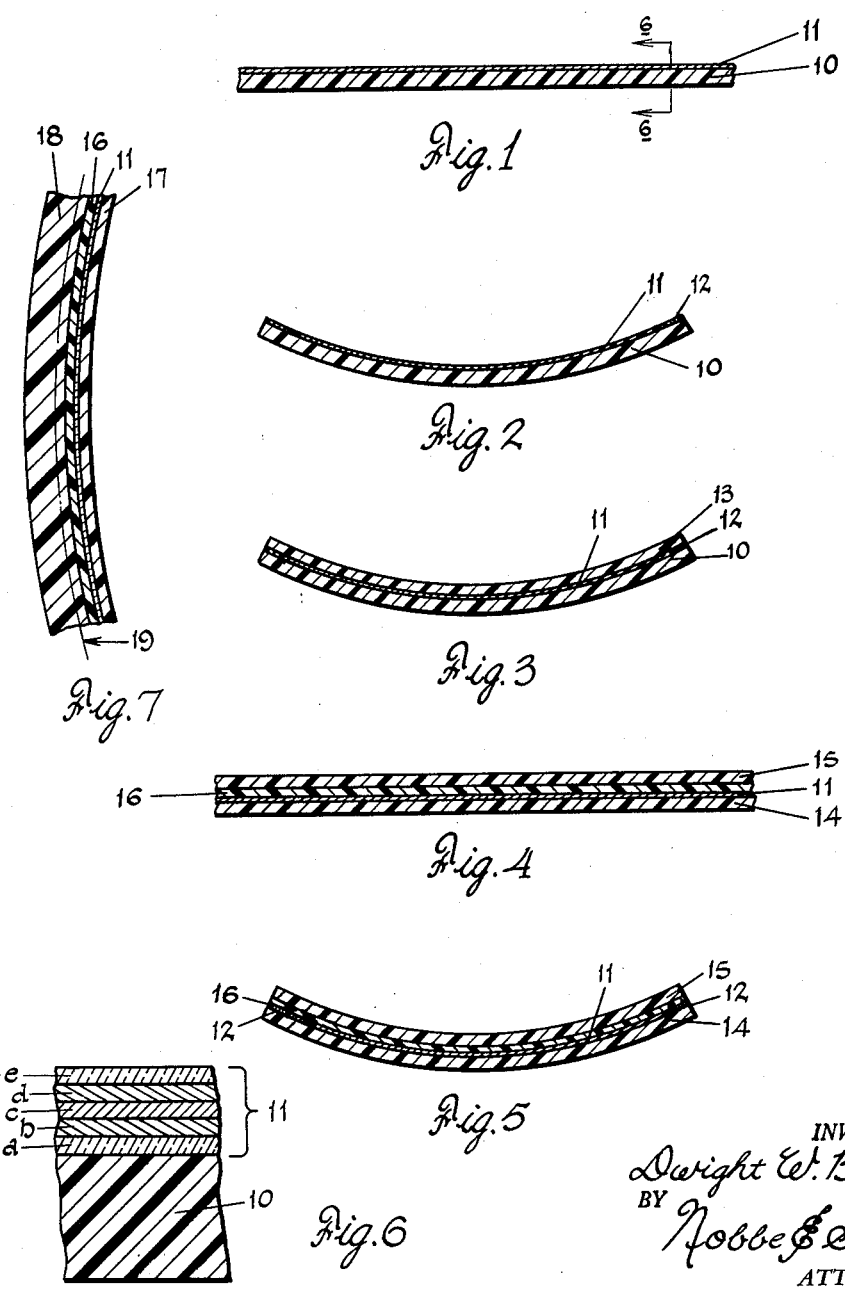
INVENTOR.
Dwight W. Barkley
BY Nobbe & Swope
ATTORNEYS United States Patent Office 3,001,901
Patented Sept. 26, 1961

3,001,901
METHOD OF PRODUCING ELECTRICALLY CONDUCTIVE ARTICLES
Dwight W. Barkley, Cheswick, Pa., assignor to Libbey-Owens-Ford Glass Company, Toledo, Ohio, a corporation of Ohio
Filed Dec. 1, 1955, Ser. No. 550,258
9 Claims. (Cl. 156—222)

The present invention relates broadly to electrically conductive films on bent sheets, and more particularly to transparent electrically conductive films on plastics.

Transparent electrically conductive films such as gold, silver, copper, iron and nickel of the type disclosed in Patent No. 2,628,927, issued February 17, 1954, to William H. Colbert et al., have generally been placed on glass sheets. Also, in the past it has been difficult to apply electrically conductive films to plastic materials, and especially to plastic materials that have a bent or curved shape because of the tendency of the plastic to deform or warp from the bent shape during the deposition of the conductive film. Nevertheless, there has been a considerable demand for bent plastic sheets having an electrically conductive film on a surface thereof, especially for use as glazings for aircraft, ships and other military equipment for the purpose of preventing or removing ice and fog formations by heat.

Because of the requirement that the transparent electrically conducting films must be applied with great uniformity so as to heat equally at all points throughout the film area when current is passed therethrough and also that they meet the rigid optical requirements necessary for military and S.A.E. codes, the coating of curved sheets has presented many problems. These problems of course are multiplied greatly when the electrically conductive film is to be placed on bent or curved plastic sheets because of the tendency of the plastic to deform during the application of such films giving uneven film application and optical distortion.

Briefly stated, the present invention alleviates the prior difficulties in filming plastic sheets by first, placing the electrically conductive film on the sheet while the sheet is flat, and then, bending the filmed blank sheet to the desired curvature in a manner so as to retain the greater portion of the electrically conducting film in compression or without any stresses at all.

Thus, it is a primary object of the invention to provide an article which is subsequently curved having an electrically conductive film that is not subjected to tensional forces.

Another object of the present invention is to provide a method of producing high quality, commercially acceptable electrically conductive films on plastics.

Another object of the invention is the provision of a method of placing electrically conducting films on bent plastic sheets which greatly reduces warpage and distortion in the finished bent and filmed plastic sheet.

A further object of the invention is the provision of a novel method of strongly securing electrically conductive films to plastics.

Other objects and advantages of the invention will become more apparent during the course of the following description when taken in connection with the accompanying drawings.

In the drawings, wherein like numerals are employed to designate like parts throughout the same:

FIG. 1 is a fragmentary sectional view of a sheet after an electrically conductive film has been placed thereon;

FIG. 2 illustrates how the sheet of FIG. 1 may be bent to a desired curvature according to the principles of the invention;

FIG. 3 is a sectional view of a laminated article formed with the bent sheet of FIG. 2 and another bent sheet;

FIG. 4 illustrates an alternate method of placing the electrically conductive film on a sheet and laminating the sheet with another sheet while both sheets are substantially flat;

FIG. 5 is a fragmentary sectional view of the laminated structure of FIG. 4 after it has been bent to a predetermined curvature;

FIG. 6 is a fragmentary sectional view of the article shown in FIG. 1 taken substantially along line 6—6 thereof illustrating the various layers which comprise the electrically conductive film; and FIG. 7 is a fragmentary sectional view of an electrically conducting article illustrating another embodiment of the invention.

Referring now more particularly to the drawings, there is shown in FIG. 1 a representative support body or sheet of plastic 10 which has an electrically conductive film 11 thereon. The electrically conductive film may comprise a sealer layer $a$ in contact with a surface of the plastic sheet 10; an adhesive layer $b$ preferably formed of a metallic oxide; a layer of electrically conductive metal $c$ such as gold, nickel, iron, silver and copper, as described in Patent 2,628,927; a second adhesive layer $d$ preferably formed of a metallic oxide; and a protective layer $e$ such as quartz, aluminum oxide, magnesium fluoride and the like. These layers are all placed on the sheet while it is in a substantially flat condition for reasons to be described later.

More specifically, the sealer layer $a$ prevents plasticizer from coming out of the plastic and affecting the adhesive characteristics of the other layers during the filming process. For most purposes, it has been found that the sealer layer may be of quartz, titanium dioxide, aluminum oxide, chromium oxide or equivalent material and may be in the neighborhood of 1¼ molecules or approximately 7 to 10 Angstrom units in thickness or thicker if desired. However, while the sealer layer is desirable, in some cases, where the plasticizer does not readily come out of the plastic when the plastic is heated slightly it may be dispensed with.

With reference now to the adhesive layer $b$, it is generally composed of metal oxide approximately ½ molecule or more in thickness which directly and permanently adheres by molecular forces to the quartz layer $a$ and also acts by strong molecular force to hold the metal layer $c$. These adhesive metal oxides may be those of lead, silver, aluminum, magnesium, nickel, zinc, thorium, and other rare earth metallic oxides and the oxides of cadmium, antimony, bismuth, mercury, copper, gold, platinum, palladium and other heavy metal oxides, which when applied over glass or other siliceous surfaces, are highly adherent to such surfaces as well as to the metals such as gold, nickel, iron, silver and copper noted above in connection with layer $c$.

The metallic oxide adhesive layers or coatings $b$ may be deposited on the sealer layer $a$ by direct thermal evaporation or, a metal or a lower oxide of the metal first deposited on the quartz by thermal evaporation may be oxidized to form a metallic oxide. A further way in which the layers of metallic oxide may be produced is by first applying a thin coating by sputtering a metal in the residual vacuum which comprises in part oxygen such that the metal is combined with the oxygen remaining in the air to form an oxide when deposited on the layer $a$.

After the oxide adhesive layer $b$ has been placed on the support body, the electrically conductive layer $c$ is deposited over the adhesive layer. Preferably, the conductive layer is deposited by means of thermal evaporation so that an extremely uniform coating may be formed as slight variations in thickness will result in areas of variable electrical conductivity and thus hot spots or unevenly heated areas will develop along the thicker areas of the layer.

By using thermal evaporation methods to deposit the electrically conductive layer $c$ there is deposited one molecule upon the other in a manner to form a smooth surface over the adhesive layer $b$. The adhesive layer acts to strongly secure the metal conductive layer to the plastic sheet 10 through the sealer layer $a$. Moreover, the adhesive layer and the sealer layer reduce the possibility of a chemical reaction or intermingling taking place between the plastic of the sheet 10 and the metal of the conductive layer.

Over the conductive metal layer $c$ there is placed a second adhesive layer $d$ formed of a metallic oxide such as described above in connection with the adhesive layer $b$ for the purpose of securing the protective layer $e$ such as quartz over the conductive layer. The protective layer helps to protect the conductive layer $c$ from mars or scratches which tend to break some of the electrical paths across the layer causing current concentrations or localized heating to develop.

To bring power to the electrically conductive film electrodes 12 are provided along a pair of opposed marginal edges of the film. These electrodes may be placed in contact with the conductive layer $c$ before the adhesive layer $d$ and protective layer $e$ are placed over the conductive film $c$ or, the adhesive layer and protective layer may be masked along the marginal edge areas or they may be removed so as to allow the electrodes to be placed in contact with the layer $c$. In some cases, if the layers $d$ and $e$ are relatively thin, the electrodes may be placed in contact with one or the other of the layers and current may be passed through the layer or layers from the electrodes to the conductive layer $c$.

Now, as one feature of the invention, it has been found that it is necessary to initially place the electrodes 12 on the article at a temperature above the normal temperature at which the plastic sheet 10 and the electrically conductive film 11 are to be heated when power is applied to the conductive layer so as to reduce the effect of the expansion of the heated plastic on the electrodes. In other words, when the plastic is heated it expands and if the electrodes are not placed on the article under conditions that corresponded to expansion conditions, later expansion of the plastic will cause the electrodes to crack thus breaking their electrical continuity.

When the electrodes are placed on the article at temperatures corresponding to operating temperatures, subsequent cooling of the article will cause the plastic to contract placing the electrodes in compression which will not affect their electrical continuity. Subsequent heating and expansion of the plastic will then only restore the electrodes to their initial state of stress and will not affect their continuity. Of course, it will be evident that the plastic may not be heated substantially above the deformation or distortion temperature and the exact temperture to which it is heated will depend upon the characteristics of the particular plastic used.

Also, according to the present invention, it is desirable that the sheet 10 be coated in a flat state because of the tendency of the plastic to warp or bend when subjected to any heating effects inherent in the coating process. This tendency of the plastic sheet to warp and bend is greatly reduced when the plastic is in its natural or flat state since the stresses that are set up in bending the sheet are not present. When the sheet is coated in a bent condition, it has been found that the elastic memory characteristics of the plastic greatly exaggerate and increase the tendency of the sheet to warp or bend to undesired curvatures and shapes when it is subjected to slight amounts of heat.

Of course, it is well known that the elastic memory characteristics of a plastic material result from the strains and molecular stresses that are set up when the sheets are initially bent, and thus, when the plastic is again subjected to slight temperatures the molecules tend to bring the sheet into a state of stress equilibrium or towards the initial flat condition. Inasmuch as the tendency of the sheets to return to their initial position is not equal because of various factors such as uneven heat, uneven stresses, etc., the sheets tend to warp unevenly. Because of the uneven surfaces so developed, the layers of the electrically conductive film 11 are not deposited on the sheet uniformly and it is relatively impossible to laminate the distorted curved sheet with another curved sheet to produce a finished, optically perfect article.

However, as is noted above, the tendency of flat plastic sheets to warp when coated is tremendously less than bent plastic sheets because of the absence of strains and stresses. As a result, it has been found flat plastic sheets may be suspended by suitable hangers or frames, not shown, in a suitable vacuum chamber and coated with the electrically conductive film while in a flat state, after which, the coated sheet may be bent to the desired curvature as shown in FIG. 2 on a suitable mold or by a suitable shaping mechanism. This method substantially reduces the tendency of the sheets to warp during the coating process. If desired, the coated bent plastic sheet may then be laminated with a suitable mating plastic sheet 13 as shown in FIG. 3. This may be accomplished by using the bonding properties of the plastic sheets such as is the case in the embodiment of FIG. 3, or a sheet of polyvinyl butyral plastic or other bonding material may be used to bond the respective sheets together.

It is to be pointed out that at all times in bending the coated plastic sheet, it is necessary that the sheet be bent so that the electrically conductive film 11 is placed on the compression side of the bend. If this were not done and the sheets were bent so that the electrically conducting film were on the tension side of the bend, the molecules would tend to stretch or pull away and the film would be subjected to fine cracks or fissures which would break the electrically conducting paths across the film. Such cracks or fissures result in hot spots or areas of current concentration and causes the film to burn out or heat unevenly.

Another method of applying the principles of the invention is shown in FIGS. 4 and 5 which differs from the method disclosed in FIGS. 1 to 3 inclusive by coating a sheet 14 while flat with the conductive film 11 and laminating it to another sheet 15 while both of the sheets are flat. As shown in FIG. 4, the sheet 14 having the electrically conductive film 11 thereon is laminated to the upper flat sheet 15 by a layer of polyvinyl butyral plastic or other suitable laminating material 16. In this instance, a sheet of polyvinyl butyral 16 has been used to bond the respective plastic sheets 14 and 15 together but, as mentioned above, the sheets may be bonded directly without the use of an interlayer if the composition of the plastic is such that it affords a firm bond when laminated.

After the sheets 14 and 15 have been laminated together, the laminated structure so formed is then bent to the desired curvature by a suitable mold or shaping tool. However, as shown in FIG. 5, the laminated structure is bent so that the electrically conductive film 11 is substantially on the concave side of sheet 14 on which it was deposited.

Thus, in both of the embodiments shown, by placing the electrically conductive film 11 on the plastic sheet or sheets in the flat and then bending the sheet and/or sheets, the plastic is able to retain its curvature and to have better optical properties since it is not again subjected to heat after it has once been bent.

Another embodiment of the invention is shown in FIG. 7 wherein an electrically conductive film 11 is placed on a sheet 17 in the flat and the sheet is then laminated by means of a layer of polyvinyl butyral 16 to a relatively thicker sheet 18. The laminated article is then bent or shaped such that the electrically conductive film 11 is on the compression side of the bent article or in other words on the concave side of the centerline 19 of the laminated article. It will be evident that the portion of the laminated article on the concave side of centerline 19 will be in compression, while the portion of the article on the convex side of the centerline will be in tension. Thus, even though the electrically conductive film 11 is on the convex side of the individual sheet 17, it still is in compression with regard to the over-all laminated structure.

In a further embodiment of the invention, the sheets may be heated to a temperature at which they expand and then the electrically conductive film may be deposited. After the sheets cool they will contract and place the film in compression. The sheets may then be bent with the electrically conductive film on the convex or tension side of the bend to a point where the tension forces as a result of the convex bend substantially balance the compression forces as a result of the contraction of the heated sheet.

Suitable plastics that may be used in the fabrication of coated bent sheets or laminated structures according to the invention are Gafite, which is methyl-a-chloroacrylate polymer made by the General Aniline and Film Corporation, New York, New York; the acrylics such as Plex II, Plex 55 and Polymer K made by Rohm & Haas, Philadelphia, Pennsylvania; the polyesters such as Sierracin made by the Sierracin Corporation, Burbank, California; and CR-39 made by the Cast Optics Company, Riverside, Connecticut; Duralite which is a methyl-methacrylate made by the Homolite Corporation, Wilmington, Delaware; and also the polystyrenes and others may be used.

While the invention as disclosed has been discussed principally with the production of laminated bent electrically conducting articles utilizing two plastic laminae, it of course will be appreciated that other types of sheets may be used and any number of sheets may be laminated together and that any number of electrically conducting films on the sheets may be used as long as the films are placed such that they will not be substantially in tension.

Also, while thermal evaporation processes have been described in particular with regard to the electrically conductive film it will be appreciated that other processes may be used in placing the respective layers on the plastic sheets but that the particular process must not require temperatures which exceed the deformation of distortion temperature of the sheets being used. It will be evident therefore that different processes may be used for plastics since not all plastics have the same distortion temperature. Also, while we have described only several of the plastics that may be used others of course may be used and these include thermoplastics as well as thermosetting plastics.

It is to be understood that the forms of the invention herewith described are to be taken as illustrative embodiments only, and that various procedural changes may be resorted to without departing from the spirit of the invention or the scope of the following claims.

I claim:

1. The method of producing a bent article comprising a transparent electrically conductive coating on a plastic sheet which has releaseable volatile materials contained therein that normally tend to prevent strong adherent coatings from being applied to the sheet, which comprises the steps of depositing upon the plastic sheet a sealer coating which is substantially impervious to the volatile material contained in the sheet, depositing an adhesive layer formed of a metallic oxide in contact with the sealer coating, depositing a transparent electrically conductive film on the adhesive layer, heating the composite structure to an elevated temperature above the normal temperature at which the sheet will be heated by the electrically conducting film when power is passed therethrough during operation, placing electrodes in contact with the electrically conductive film at the elevated temperature, allowing the article to cool to place the electrodes in compression such that they will remain in compression when the composite structure is heated by the electrically conducting film to normal operating temperature, and bending the composite structure to place the electrically conducting film in compression.

2. In the method of producing a bent laminated article provided with a transparent electrically conductive film according to the method of claim 1, in which said filmed bent sheet is laminated with another plastic sheet of substantially the same curvature.

3. The method of producing a bent laminated article provided with a transparent electrically conductive film as claimed in claim 2, in which the electrically conductive film is placed between the laminated sheets.

4. A method of producing a bent article formed of a plurality of sheets which tend to warp when heated and provided with a transparent electrically conductive film, comprising placing an electrically conductive film by means of thermal evaporation on a flat surface of one of said sheets, laminating said sheets together while in a flat condition, and bending said laminated structure to the desired curvature in which the electrically conductive film is placed in compression by an adjacent concave surface of the laminated structure.

5. The method of producing a bent article formed of a plurality of sheets and provided with an electrically conductive film as claimed in claim 4, in which said sheets are of a plastic material.

6. The method of producing a bent sheet provided with an electrically conductive film, which comprises heating a sheet to a temperature at which it expands, placing an electrically conductive film on a surface of said sheet while the sheet is in its expanded condition, allowing said sheet to cool to place said electrically conductive film in compression, and then bending said sheet such that the film will be placed substantially in compression.

7. The method of forming an electrically conductive coating on a plastic support body, which comprises thermally evaporating an electrically conductive film on the support body, heating the plastic support body to an elevated temperature above the normal temperature at which the plastic will be heated by the electrically conductive film when power is passed therethrough during operation, placing electrodes in contact with said electrically conductive film at the elevated temperature, and allowing the article to cool to place the electrodes in compression such that they will remain in compression when the article is heated by the electrically conductive film to normal operating temperature.

8. The method of forming a transparent electrically conductive coating on a plastic support body which has releasable volatile materials contained therein that normally tend to prevent strong adherent coatings from being applied to said body, which comprises thermally evaporating upon the plastic support body a sealer coating which is substantially impervious to the volatile material contained in the plastic support body, thermally evaporating an adhesive layer formed of a metallic oxide in contact with the sealer coating, thermally evaporating a transparent electrically conductive film on the adhesive layer, heating the composite structure to an elevated temperature above the normal temperature at which the plastic will be heated by the electrically conductive film when power is passed therethrough during operation, placing electrodes in contact with the electrically conductive film at the elevated temperature, and allowing the article to cool to place the electrodes in compression such that they will remain in compression when the article is heated with the electrically conductive film to normal operating temperature.

9. The method of producing a transparent distortion free bent sheet having a relatively stress free transparent electrically conductive film on a convex surface thereof, comprising heating a flat transparent sheet to a temperature at which it expands, thermally evaporating a transparent electrically conductive film on one surface of the sheet while the sheet is in the expanded condition, cooling the sheet to a temperature at which it contracts thereby placing the film in compression, and bending the sheet away from the filmed surface to a point where the tension forces caused by the convex bending of the sheet substantially balance the compression forces caused by the contraction of the heated sheet whereby internal stresses in the film are substantially removed.

References Cited in the file of this patent

UNITED STATES PATENTS

| | | |
|---|---|---|
| 632,008 | Dorpols | Aug. 29, 1899 |
| 2,357,537 | Orser et al. | Sept. 5, 1944 |
| 2,439,137 | Keller | Apr. 6, 1948 |
| 2,439,654 | Gaiser et al. | Apr. 13, 1948 |
| 2,567,331 | Gaiser et al. | Sept. 11, 1951 |
| 2,628,927 | Colbert et al. | Feb. 17, 1953 |
| 2,638,428 | Gordon et al. | May 12, 1953 |
| 2,640,904 | Gaiser | June 2, 1953 |
| 2,761,945 | Colbert et al. | Sept. 4, 1956 |
| 2,900,545 | Rulon et al. | Aug. 18, 1959 |

FOREIGN PATENTS

| | | |
|---|---|---|
| 599,617 | Great Britain | Mar. 17, 1948 |
| 200,474 | Australia | Dec. 14, 1955 |

OTHER REFERENCES

Dalin et al.: Report entitled "The Development of Electrical Conducting Transparent Coatings for Acrylic Plastic Sheet," W.A.D.C. Technical Report 53-378 (January 1954), page 11, lines 4-16 relied upon.